E. JONES.
DEMOUNTABLE RIM.
APPLICATION FILED MAY 22, 1914.
1,133,152.
Patented Mar. 23, 1915.
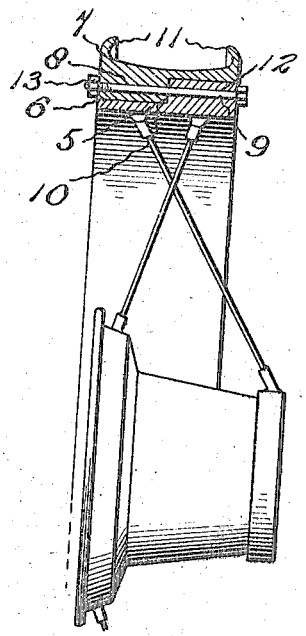
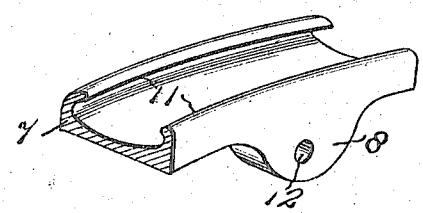
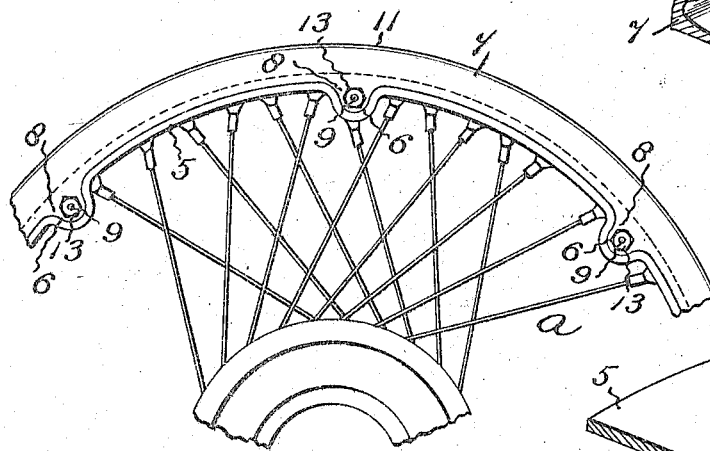
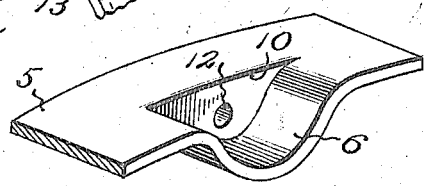
Inventor
Edward Jones
By Victor J. Evans
Attorney
Witnesses
C. James Cronin
M. E. Laughlin

UNITED STATES PATENT OFFICE.

EDWARD JONES, OF GREAT NECK, NEW YORK.

DEMOUNTABLE RIM.

1,133,152.

Specification of Letters Patent. Patented Mar. 23, 1915.

Application filed May 22, 1914. Serial No. 840,342.

*To all whom it may concern:*

Be it known that I, EDWARD JONES, a citizen of the United States, residing at Great Neck, in the county of Nassau and State of New York, have invented new and useful Improvements in Demountable Rims, of which the following is a specification.

The general object of this invention is to refine the construction of vehicle wheels in point of providing a demountable rim for the same so that the vehicle tire which is secured to the said rim may be readily removed and replaced in a much more convenient and efficient manner than has heretofore been done. And to these ends the invention consists of a wheel having a fixed rim provided with a series of sockets arranged on its periphery and an independent demountable rim adapted to be fitted over the said fixed rim and provided with a series of bosses adapted to be fitted within the sockets and means for securing the rims together.

Other objects will appear and be better understood from that embodiment of my invention of which the following is a specification, reference being had to the accompanying drawings forming part thereof, in which,—

Figure 1 is a vertical sectional view of a portion of my improved wheel. Fig. 2 is a side view of a portion of my wheel. Fig. 3 is a detail perspective view of a portion of the demountable rim, and Fig. 4 is a detail perspective view of a portion of the fixed rim.

As shown in the drawings my improved wheel *a* is provided with a fixed rim 5 having a series of sockets 6, and a demountable rim 7 having a series of bosses 8 which are fitted within the sockets and secured therein by means of the bolts 9. The wheel *a* is similar in general structure to the wire-wheel now in use, and has its rim 5 connected with the hub *b* by the wire spokes *c*.

The fixed rim 5 may be made of any suitable material and is provided with a series of radially disposed projections forming sockets 6 which are in spaced relation with each other on the periphery of the fixed rim. These sockets are disposed inwardly toward the center of the wheel and are substantially semi-circular in shape, and may be of any depth suitable to the design and construction of the wheel. By referring to Fig. 4 it will be noted that the width of these sockets is not equal to the width of the fixed rim, but are preferably of a width equal to half the width of the fixed rim or approximately so, thus a side wall 10 is provided against which the bosses 8 of the rim 7 are adapted to contact when the rim is in position upon the wheel. The rim 7 may also be formed of any material desired and is provided with the usual inturned side flanges 11 on the periphery thereof for securing a tire thereto. It is obvious that the circumference of the rim 7 is of sufficient size to be mounted on the fixed rim 5, and thus has provided on its inner periphery the bosses 8 which are spaced from each other so as to be fitted in the correspondingly spaced sockets 6 of the fixed rim. The bosses are preferably formed integrally with the demountable rim, but this is not essential to the ideal operation of the wheel; the bosses are shaped so as to conform to the shape of the sockets 6, so that when the bosses are fitted snugly within the sockets, the demountable rim will be securely held to the fixed rim in a rigid and substantial manner.

The width of the bosses corresponds to the width of the sockets as shown in Fig. 1; thus when the demountable rim is mounted on the fixed rim, the two members coöperate to form a solid rim structure, and in order to secure the two members together the bosses and side walls 10 of the fixed rim are provided with laterally disposed alining bores 12, for receiving the bolts 9, which by virtue of having detachable nuts 13 at one end, may be readily disengaged from the parts for the purpose of demounting the rim 7 from the rim 5 when desired.

It is obvious that those skilled in the art may vary the details of construction and arrangements of parts without departing from the spirit of my invention and therefore I do not wish to be limited to any such features except as may be required by the claim.

What I claim as new is:—

In a vehicle wheel the combination of a fixed rim having a series of inwardly disposed projections which extend transversely across the said fixed rim from edge to edge thereof, said fixed rim having sockets arranged around the periphery thereof and located in said inwardly disposed projections and extending approximately one half of the length thereof transversely of the fixed rim, and a demountable rim circumscribing the fixed rim, said demountable rim having a series of inwardly projecting bosses disposed in the sockets and bolts for securing the projections within the sockets.

In testimony whereof I affix my signature in presence of two witnesses.

EDWARD JONES.

Witnesses:
    JOHN ORR,
    JOHN DIECKMAN.